(12) United States Patent
Park

(10) Patent No.: US 9,368,152 B1
(45) Date of Patent: Jun. 14, 2016

(54) FLEXIBLE VIRTUAL DEFECT PADDING

(71) Applicant: Seagate Technology LLC, Cupertino, CA (US)

(72) Inventor: MoonChol Park, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/553,460

(22) Filed: Nov. 25, 2014

(51) Int. Cl.
*G11B 5/09* (2006.01)
*G11B 11/10* (2006.01)
*G11B 27/36* (2006.01)
*G11B 20/18* (2006.01)
*G11B 7/0037* (2006.01)
*G11B 5/012* (2006.01)

(52) U.S. Cl.
CPC ............ *G11B 20/1889* (2013.01); *G11B 5/012* (2013.01); *G11B 7/00375* (2013.01); *G11B 20/18* (2013.01); *G11B 20/1816* (2013.01); *G11B 20/1879* (2013.01); *G11B 20/1883* (2013.01); *G11B 27/36* (2013.01); *G11B 2020/1873* (2013.01); *G11B 2020/1893* (2013.01); *G11B 2020/1896* (2013.01)

(58) Field of Classification Search
CPC ............... G11B 2020/1277; G11B 2220/2516; G11B 20/1883; G11B 20/1816; G11B 11/10595; G11B 19/04; G11B 2020/1232; G11B 2020/1281; G11B 20/1217; G11B 20/18; G11B 20/1833; G11B 27/36; G06F 12/0246; G11C 29/76
USPC .......... 369/47.14, 44.32, 44.33, 44.25–44.29, 369/47.15, 53.11–53.17, 53.22, 53.42
See application file for complete search history.

(56) References Cited

U.S. PATENT DOCUMENTS

| 5,341,359 | A | * | 8/1994 | Birukawa et al. .......... 369/53.15 |
| 5,995,463 | A | | 11/1999 | Sakashita |
| 6,034,831 | A | | 3/2000 | Dobbek et al. |
| 6,205,099 | B1 | | 3/2001 | Sasaki et al. |
| 6,223,303 | B1 | | 4/2001 | Billings et al. |
| 6,480,445 | B1 | | 11/2002 | Yun et al. |
| 7,047,438 | B2 | | 5/2006 | Smith et al. |
| 7,215,619 | B1 | | 5/2007 | Van Den Enden |
| 7,546,495 | B2 | | 6/2009 | Brondijk |
| 7,583,461 | B2 | | 9/2009 | Kudoh et al. |
| 7,617,419 | B2 | | 11/2009 | Park |

(Continued)

FOREIGN PATENT DOCUMENTS

| JP | 06243472 | 9/1994 |
| JP | 2009181672 | 8/2009 |
| KR | 1020040045644 | 6/2004 |

OTHER PUBLICATIONS

Jun, Walter; Final Office Action for U.S. Appl. No. 13/240,554, filed Sep. 22, 2011, mailed May 22, 2014, 21 pgs.
Jun, Walter; Non-Final Office Action for U.S. Appl. No. 13/240,554, filed Sep. 22, 2011, mailed Nov. 5, 2013; 20 pgs.

(Continued)

*Primary Examiner* — Dionne H Pendleton
(74) *Attorney, Agent, or Firm* — Taylor English Duma LLP

(57) ABSTRACT

Technologies are described herein for performing flexible virtual defect padding of bad sectors on recording media of a storage device. A defective sector on a data track of a recording medium in the storage device is detected. The size and position of a physical defect within the defective sector are determined, and one or more sectors adjacent to the defective sector on the data track are mapped as virtual defects based on the size and position of the physical defect within the defective sector.

18 Claims, 5 Drawing Sheets

(56) References Cited

U.S. PATENT DOCUMENTS

| | | | |
|---|---|---|---|
| 8,018,671 | B2 | 9/2011 | Kuan et al. |
| 8,345,367 | B1 | 1/2013 | Tharumalingam |
| 8,493,681 | B1 | 7/2013 | Selvaraj |
| 2002/0122266 | A1 | 9/2002 | Andoh et al. |
| 2002/0191319 | A1 | 12/2002 | Liew et al. |
| 2003/0048707 | A1 | 3/2003 | Ono |
| 2005/0138464 | A1* | 6/2005 | Chong et al. ............ 714/5 |
| 2005/0162947 | A1* | 7/2005 | Kim et al. ............ 365/200 |
| 2006/0230328 | A1* | 10/2006 | Blacquiere et al. ......... 714/763 |
| 2007/0247991 | A1 | 10/2007 | Nakagawa |
| 2009/0195917 | A1 | 8/2009 | Aso et al. |
| 2010/0097903 | A1 | 4/2010 | Kimura et al. |
| 2012/0092975 | A1* | 4/2012 | Jun ............ 369/43 |
| 2013/0064060 | A1 | 3/2013 | Oberg |

OTHER PUBLICATIONS

Jun, Walter; Non-Final Office Action for U.S. Appl. No. 13/240,554, filed Sep. 22, 2011, mailed Dec. 3, 2014, 24 pgs.

Jun, Walter; Restriction Requirement for U.S. Appl. No. 13/240,554, filed Sep. 22, 2011, mailed Jun. 20, 2013; 7 pgs.

Jun, Walter; U.S. Patent Application Entitled: Method of Performing Read/Write Process on Recording Medium, Parameter Adjustment Method, Storage Device, Computer System, and Storage Medium Employing the Methods, U.S. Appl. No. 13/240,554, filed Sep. 22, 2011, 81 pgs.

Jun, Walter; Non-Final Office Action for U.S. Appl. No. 13/240,554, filed Sep. 22, 2011, mailed Jul. 1, 2015, 18 pgs.

Jun, Walter; Non-Final Office Action for U.S. Appl. No. 13/240,554, filed Sep. 22, 2011, mailed Jan. 15, 2016, 16 pgs.

\* cited by examiner

FLEXIBLE VIRTUAL DEFECT PADDING

BRIEF SUMMARY

The present disclosure relates to technologies for performing flexible virtual defect padding of bad sectors on recording media of a storage device. According to some embodiments, a method comprises detecting a defective segment on a data track of the recording media. The size and position of a physical defect within the defective segment are determined, and one or more segments adjacent to the defective segment on the data track are mapped as virtual defects based on the size and position of the physical defect within the defective segment.

According to further embodiments, a computer-readable medium has processor-executable instructions stored thereon that, when executed by a processor connected to a storage device, cause the processor to detect a defective sector on a data track of the recording media. The processor further determines a size and position of a physical defect within the defective sector, and maps one or more sectors adjacent to the defective sector as virtual defects based on the size and position of the physical defect within the defective sector.

According to further embodiments, a system comprises a hard disk drive comprising a recording medium, a processor operably connected to the hard disk drive, and a virtual defect padding module operably connected to the hard disk drive and the processor. The virtual defect padding module is configured to detect a defective sector on a data track of the recording medium, logically divide the defective sector into a plurality of subdivisions, and determine a size and position of a physical defect within the defective sector in regard to the plurality of subdivisions. If it is determined that the physical defect is within a first subdivision of the plurality of subdivisions, the virtual defect padding module is configured to map a preceding adjacent sector on the data track as a virtual defect. If it is determined that the physical defect is within a last subdivision of the plurality of subdivisions, the virtual defect padding module is configured to map a following adjacent sector on the data track as a virtual defect.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to technologies for performing flexible virtual defect padding of bad sectors on recording media of a storage device, such as a hard-disk drive ("HDD") device, in order to minimize capacity loss while maintaining reliability of the device. A sector in an HDD may be determined to be defective when it contains one or more physical defects, such as a scratch or other anomaly in the recording surface of the media. In a conventional HDD, a predetermined number of sectors adjacent to the defective sector may be mapped as virtual defects, or "scratch fill," so that those sectors are not accessed during data write and read operations of the device. In this way, the defective sector is padded with virtually defective sectors so that the reliability of the device may be maintained even if the physical defect(s) grow during normal operation of the device.

However, as the size of physical sectors in an HDD increases, the loss in storage capacity resulting from conventional virtual defect padding correspondingly increases. For example, if the size of the sector in an HDD is increased from 512 B to 4 KB, the amount of capacity loss due virtual defect padding grows 8-fold, because the predetermined number of normal sectors are mapped as virtual defects without considering the size and position of the physical defect(s) within the defective sector. According to the embodiments described herein, in order to avoid this increase in capacity loss, the controller of a storage device is configured to determine the actual size and position of the physical defects within the defective sector so that only necessary portion(s) of the sectors adjacent to the scratch defect are mapped as the virtual defect(s), thus maintaining the reliability of the device while reducing the capacity loss.

Figure 1:
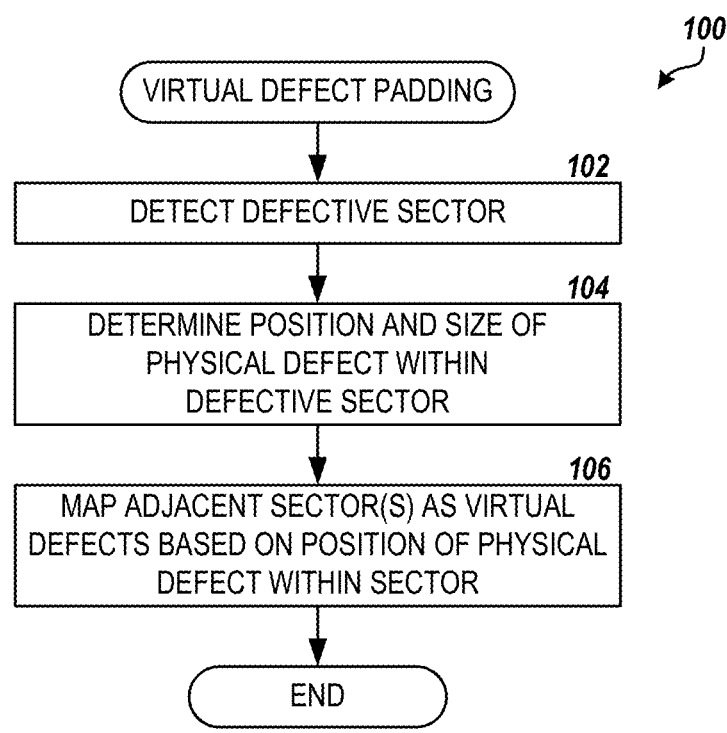
FIG. 1 is a flow diagram showing one routine for performing flexible virtual defect padding of bad sectors on recording media of a storage device, according to embodiments described herein.

FIG. 1 illustrates a novel routine 100 for performing flexible virtual defect padding of bad sectors on recording media, such as the disk media of an HDD device, in order to minimize capacity loss while maintaining the reliability of the device, according to the embodiments described herein. According to some embodiments, the routine 100 may be performed by a controller of the HDD device when mapping defective sectors on the disk media, such as during "burn-in" or CERT processing of the device and/or during normal operation, also referred to herein as "user condition." The routine 100 includes step 102, where a defective sector on the disk media is detected. For example, repeated read errors of a sector may result in a determination that the sector contains one or more physical defects, such as a scratch present on the recording surface at the sector's location. The sector may be mapped as a defective sector by adding the sector to the P-list of a defects table maintained in a memory of the controller, for example.

The routine 100 proceeds from step 102 to step 104, where the size and position of the physical defect or defects within the defective sector are determined. In some embodiments, this may be accomplished by writing specific data patterns to portions of the sector and then reading the written data to detect positional errors within the sector. From step 104, the routine 100 proceeds to step 106, where one or more adjacent sectors on the disk media adjacent to the defective sector are mapped as virtual defects based on the size and position of the physical defect(s) within the defective sector. For example, the preceding sector on the same data track, the following sector on the data track, or both may be mapped as virtual defects, as is described in more detail below. From step 106, the routine 100 ends.

Figure 2:
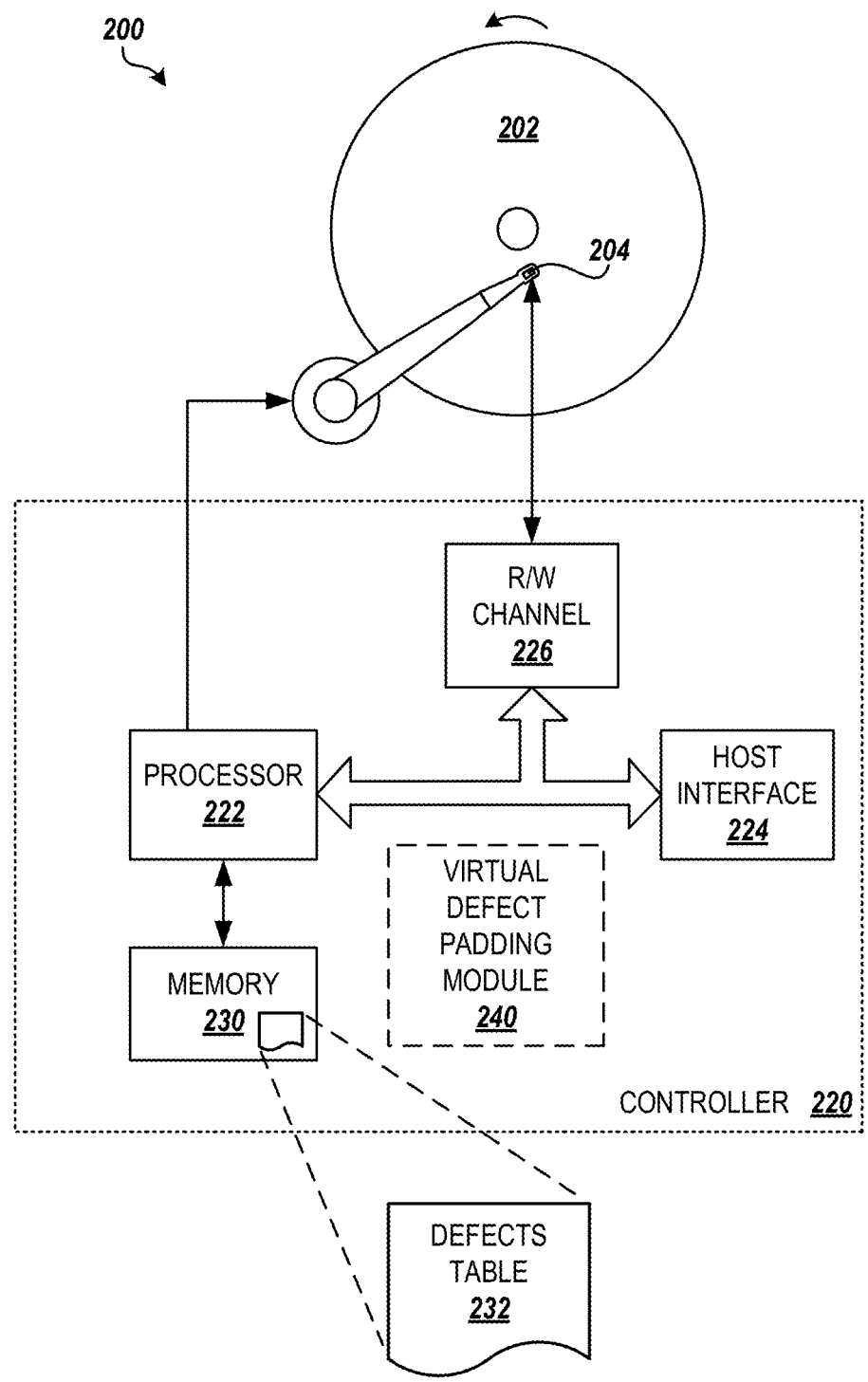
FIG. 2 is a block diagram showing an illustrative environment for performing flexible virtual defect padding of bad sectors on recording media of a storage device, according to embodiments described herein.
Figure 3:
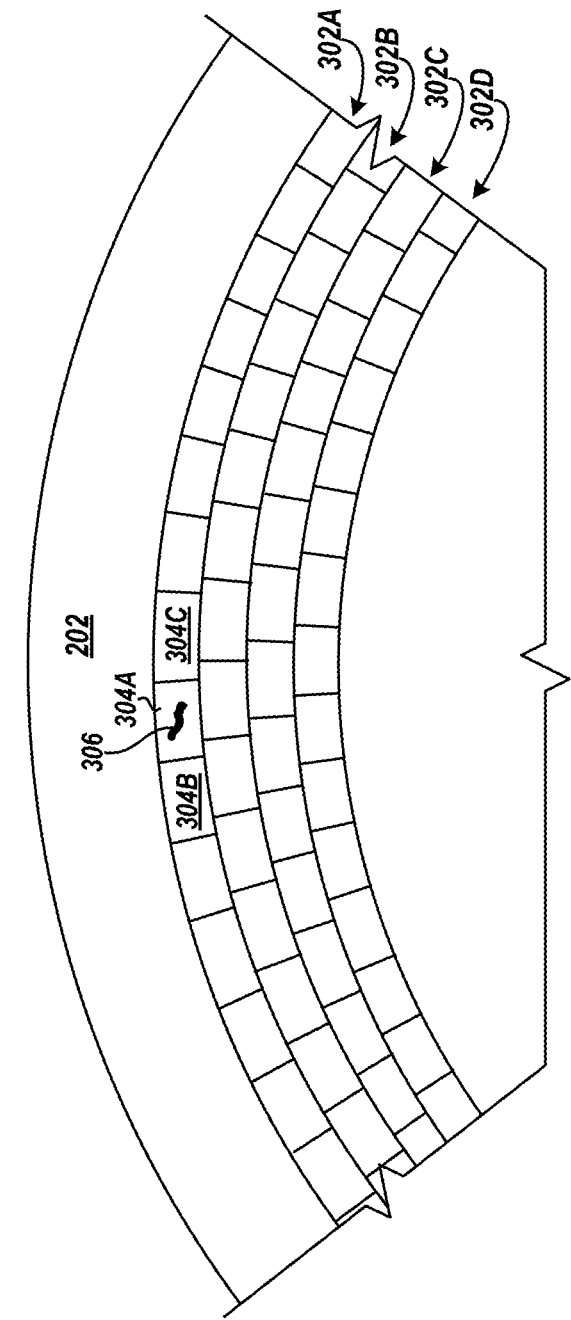
FIG. 3 is a block diagram showing an illustrative layout of data tracks and sectors on disk media, according to embodiments described herein.

FIG. 2 and the following description are intended to provide a general description of a suitable environment in which the embodiments described herein may be implemented. In particular, FIG. 2 shows an illustrative storage device 200, such as an HDD device, along with hardware, software and components for performing flexible virtual defect padding of bad sectors on recording media of the device, according to the embodiments provided herein. The storage device 200 may include recording media comprising at least one platter or disk 202. The disk(s) 202 may include a magnetic recording surface divided or "formatted" into a number of individual data tracks, such as data tracks 302A-302E (referred to herein generally as data tracks 302) shown in FIG. 3. The data tracks 302 may represent substantially concentric circular areas on the surface of the disk 202. Each data track 302 may be further divided or formatted into a number of data segments or "sectors," such as sectors 304A-304C (referred to herein generally as sectors 304). The sectors 304 may represent independent areas of the data track 302 in which user data is stored. It will be appreciated that the number of sectors 304 per data track 302 may vary from zone to zone and that the sectors of two adjacent data tracks within a zone may or may not be aligned. According to embodiments, some sectors on the disk 202, such as sector 304A, may contain a physical defect 306, such as a scratch or other anomaly in the magnetic recording surface, that make the sector unsuitable for reliably storing data. Such sectors are referred to herein as defective sectors or "bad" sectors.

Returning to FIG. 2, the storage device 200 further includes at least one read/write head 204 located adjacent to the recording surface of each disk 202. The read/write head 204 may read information from the disk 202 by sensing a magnetic field formed on portions of the surface of the disk, and may write information to the disk by magnetizing a portion of the surface of the disk. The read/write head 204 may be located at the distal end of an arm 206 that is rotated by an actuator 208, such as a voice-coil motor ("VCM"), in order to reposition the read/write head 204. The read/write head 204 may incorporate multiple components, including reader elements, such as magneto-resistive ("MR") readers, tunneling MR readers, or the like; writer elements; writer shields; head heaters; sliders; and the like.

The storage device 200 may further comprise a controller 220 that controls the operations of the storage device. The controller 220 may include a processor 222. The processor 222 may implement an interface 224 allowing the storage device 200 to communicate with a host device, other parts of the storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transferring the formatted data via a read/write channel 226 through the read/write head 204 and to the surface of the disk 202. The processor 222 may further process read commands from the host device by determining the location of the desired data on the surface of the disk 202, positioning the read/write head(s) 204 over the determined location, reading the data from the surface of the disk via the read/write channel 226, correcting any errors and formatting the data for transfer to the host device.

The read/write head 204 may be positioned to read or write data to one or more sectors 304 on a target data track 302 on the on the recording surface of the disk 202 by moving the read/write head 204 radially across the tracks using the actuator 208 while a spindle motor rotates the disk to bring the target location(s) under the read/write head. The read/write channel 226 may convert data between the digital signals processed by the processor 222 and the analog read and write signals conducted through the read/write head 204 for reading and writing data to the surface of the disk 202.

The controller 220 may further include a computer-readable recording medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 230 may further comprise a portion of the storage media of the storage device 200, such as the maintenance cylinder ("M/C") of the disk 202. For example, the memory 230 may store a firmware that comprises commands and data necessary for performing the operations of the storage device 200. According to further embodiments, the memory 230 may store processor-executable instructions that, when executed by the processor, perform the routines 100 and 500 for performing flexible virtual defect padding of bad sectors on recording media of the storage device 200, as described herein.

In some embodiments, the memory 230 may store a defects table 232 containing one or more lists of defective sectors 304 on the recording media of the storage device 200. For example, the defects table 232 may consist of a primary defects table, or "P-list," containing bad sectors encountered during CERT testing of the storage device 200, and a growth defects table, or "G-list," containing sectors which have become corrupted while the device is in use. In further embodiments, the defects table 232 may be stored in a memory or other computer-readable media of a computing system external to and operably connected to the storage device 200, such as in a driver module or file system module of a host device connected to the storage device through the interface 224, for example.

In addition to the memory 230, the environment may include other computer-readable media storing program modules, data structures, and other data described herein for performing flexible virtual defect padding of bad sectors on recording media of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the environment may include a virtual defect padding module 240. The virtual defect padding module 240 may map one or more sectors 304 adjacent to a defective sector as virtual defects when the defective sector is detected. According to some embodiments, the virtual defect padding module 240 may be implemented in the controller 220 as software, hardware, or any combination of the two. For example, the virtual defect padding module 240 may be stored in the memory 230 as part of the firmware of the storage device 200 and may be executed by the processor 222 for performing the methods and processes described herein. The virtual defect padding module 240 may alternatively or additionally be stored in other computer-readable media accessible by the controller 220. In further embodiments, the virtual defect padding module 240 may be implemented in a computing system external to and operably connected to the storage device 200, such as in a driver module or file system module of a host device connected to the storage device through the interface 224, for example. The virtual defect padding module 240 may further be stored in a memory or other computer-readable media accessible by the computing system and be executed by a processor of the computing system.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in the FIG. 2, may include other components that are not explicitly shown in the figures or may utilize an architecture completely different than that shown in the figures.

Figure 4:
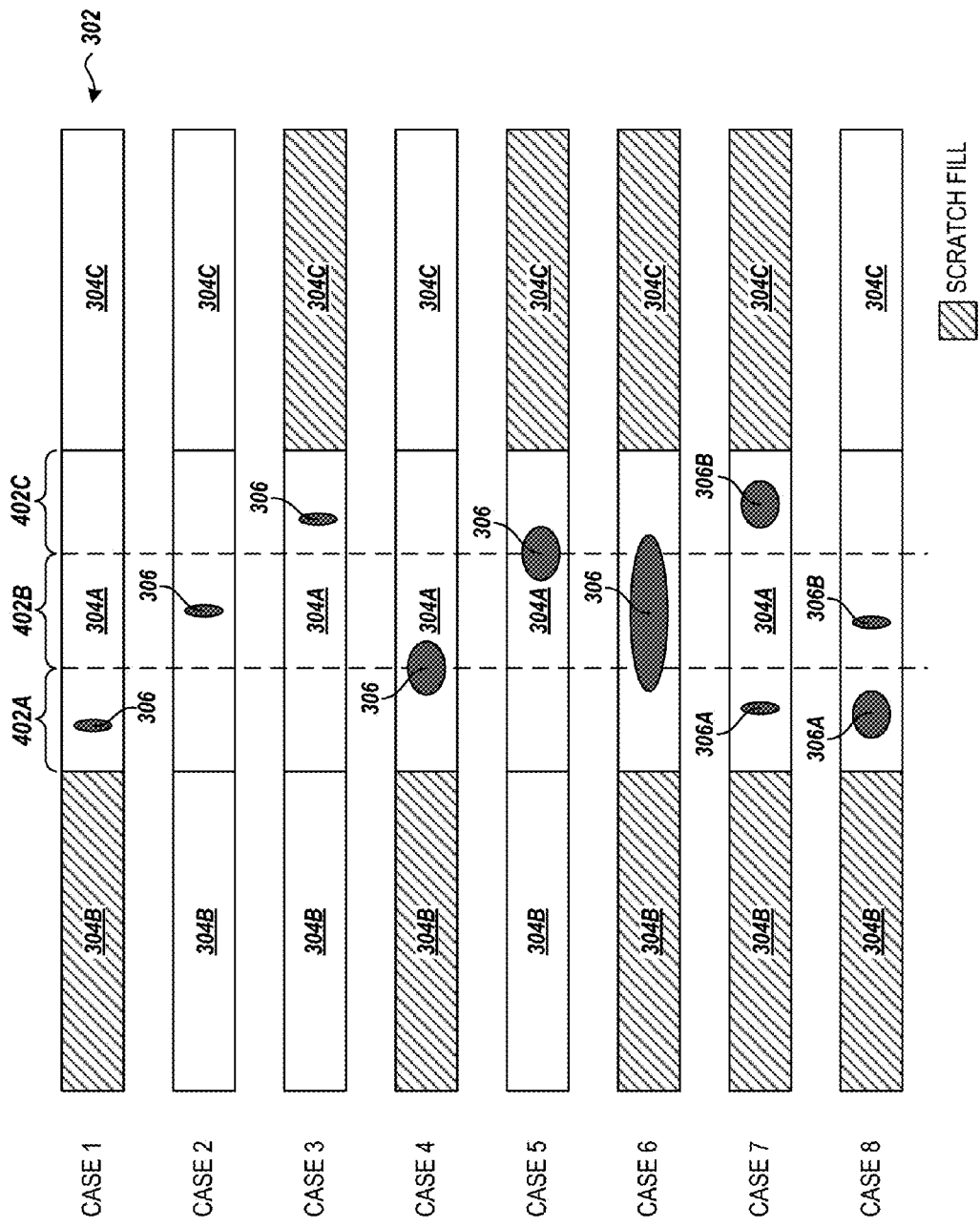
FIG. 4 is a block diagram showing additional details of a flexible virtual defect padding scheme for padding bad sectors on a recording media, according to embodiments described herein.

FIG. 4 shows additional details of a flexible virtual defect padding scheme for padding bad sectors on a recording media formatted with large sector sizes, such as 4 KB sectors, according to embodiments described herein. According to embodiments, the size and position of physical defect(s) 306 within each defective sector 304A is utilized to determine which, if any, of the adjacent, normal sectors 304B and 304C are mapped as virtual defects. The defective sector 304A may be logically divided into a number of subdivisions 402A-402C (referred to herein generally as subdivisions 402). For example, the defective sector 304A may be divided substantially into thirds. It will be appreciated that there may be any number and size of subdivisions 402 and that the subdivisions may not be the same size.

In some embodiments, if the physical defect 306 is located entirely within the first subdivision 402A of the defective sector 304A, then only the preceding sector 304B is mapped as a virtual defect or scratch fill, as shown in case 1 in FIG. 4. As shown in case 2, if the physical defect 306 is located entirely within the center subdivision 402B of the defective sector 304A, then none of the adjacent sectors 304B, 304C are mapped as virtual defects since the larger sector provides adequate padding around the defect. As shown in case 3, if the physical defect 306 is located entirely within the last subdivision 402C of the defective sector 304A, then only the following sector 304C is mapped as a virtual defect.

According to further embodiments, if the physical defect 306 spans both the first subdivision 402A and the center subdivision 402B of the defective sector 304A, then the preceding sector 304B is mapped as a virtual defect, as shown in case 4. Similarly, as shown in case 5, if the physical defect 306 spans both the center subdivision 402B and the last subdivision 402C of the defective sector 304A, then the following sector 304C is mapped as a virtual defect. As shown in case 6, if the physical defect 306 spans all subdivisions 402A-402C of the defective sector 304A, then both adjacent sectors 304B and 304C may be mapped as virtual defects.

In further embodiments, the size and position of multiple physical defects 306 within the defective sector 304A may determine which of the adjacent sectors 304B, 304C are mapped as virtual defects. For example, as shown in case 7, one of two physical defects 306A and 306B is located within the first subdivision 402A of the defective sector, while the other is located within the last subdivision 402C. In this case, both of the adjacent sectors 304B and 304C may be mapped as virtual defects. As shown in case 8, one of the two physical defects 306A and 306B is located within the first subdivision 402A of the defective sector, while the other is located within the center subdivision 402B. In this case, only the preceding sector 304B is mapped as a virtual defect. It will be appreciated that various combination of physical defects 306 located within any of a number of subdivisions 402 of the defective sector 304A may result in none of, either, or both of the adjacent sectors 304B and 304C being mapped as virtual defects. In addition, similar determinations of adjacent sectors 304 in adjacent data tracks 302 to be mapped as virtual defects may be made based on the size and position of physical defect(s) 306 within the defective sector 304A for padding the cross-track direction. It is intended that all such combinations and determinations be included in this application.

Figure 5:
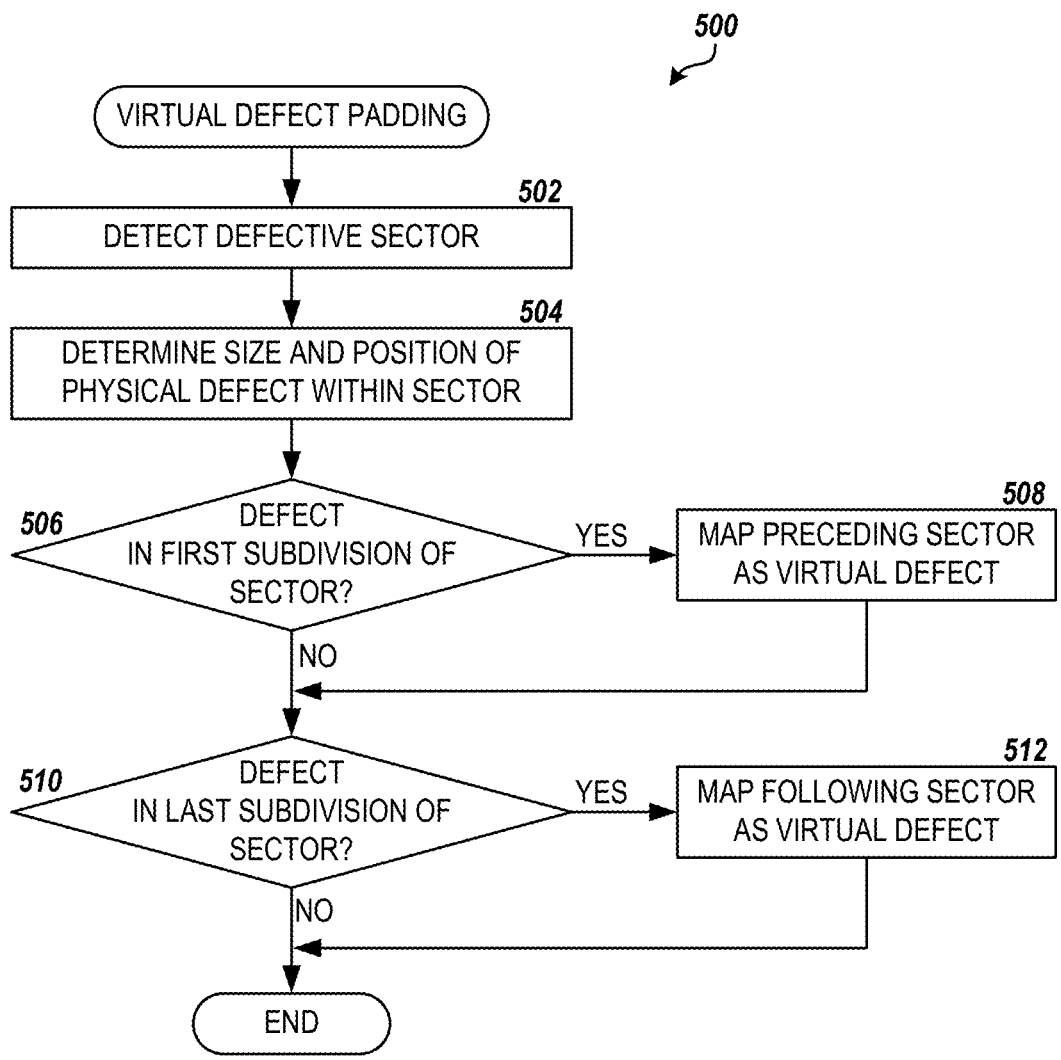
FIG. 5 is a flow diagram showing another routine for performing flexible virtual defect padding of bad sectors on recording media of a storage device, according to embodiments described herein.

FIG. 5 illustrates one routine 500 for performing flexible virtual defect padding of bad sectors on recording media of a storage device using the determinations described above in regard to FIG. 4, according to embodiments. In some embodiments, the routine 500 may be performed by the virtual defect padding module 240 during mapping of defective sectors 304 on the recording media of the storage device, such as during CERT processing of an HDD device described above. Additionally or alternatively, the routine 500 may be performed when a defective sector is detected during normal operations in the user condition of the device. In further embodiments, the routine 500 may be performed by the controller 220 of the storage device 200, by external processors or computing systems accessing data from the device, or by some other combination of modules, processors and devices.

The routine 500 begins at step 502, where the virtual defect padding module 240 detects that a sector 304A is a defective or bad sector. For example, repeated read errors of the sector 304A may result in a determination that the sector contains one or more physical defects 306, such as a scratch or other anomaly in the recording surface of the disk media. The sector 304A may be mapped as a defective sector by adding the sector to the P-list or G-List of a defects table 232 maintained in the memory 230 of the storage device 200, for example. From step 502, the routine proceeds to step 504, where the virtual defect padding module 240 determines the size and position of the physical defect(s) 306 within the defective sector 304A. In some embodiments, this may be accomplished by writing a specific data pattern to the defective sector 304A and then reading the written data to detect positional errors within the sector.

The routine proceeds from step 504 to step 506, where the virtual defect padding module 240 determines whether a physical defect 306 in the defective sector 304A is located partially or wholly within the first subdivision 402A of the sector. As described above, the defective sector 304A may be logically divided into a number of subdivisions 402 by the virtual defect padding module 240. Using the size and position of the physical defect(s) 306 as determined in step 504, the virtual defect padding module 240 may determine whether any portion of any defect lies within the first subdivision 402A, such as in cases 1, 4, 6, 7, and 8 shown in FIG. 4, for example.

If a physical defect 306 in the defective sector 304A is located partially or wholly within the first subdivision 402A of the sector, then the routine 500 proceeds from step 506 to step 508, where the preceding adjacent sector 304B on the data track 302 of the disk media is mapped as a virtual defect. For example, the preceding sector may be added to the G-list in the defects table 232 in the memory 230 of the storage device 200.

Similarly, at step 510, the virtual defect padding module 240 determines whether a physical defect 306 in the defective sector 304A is located partially or wholly within the last subdivision 402C of the sector. This may be the circumstance in cases 3, 5, 6, and 7 shown in FIG. 4, for example. If a physical defect 306 in the defective sector 304A is located partially or wholly within the last subdivision 402C of the sector, then the routine 500 proceeds from step 510 to step 512, where the following adjacent sector 304C on the data track 302 of the disk media is mapped as a virtual defect. For example, the following sector 304C may be added to the G-list in the defects table 232 in the memory 230 of the storage device 200. From step 512, the routine 500 ends.

Based on the foregoing, it will be appreciated that technologies for flexible virtual defect padding of bad sectors on recording media of a storage device are presented herein. While embodiments are described herein in regard to an HDD apparatus, it will also be appreciated that the embodiments described in this disclosure may be utilized by any storage device implementing utilizing a recording medium formatted in sectors or segments and using padding or scratch fill around defective sectors. This may include a magnetic disk drive, a hybrid magnetic and solid state drive, a magnetic tape drive, an optical disk drive, and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   detecting a defective sector on a data track of a recording medium in a storage device;
   determining a size and position of a physical defect within the defective sector;
   logically dividing the defective sector into a plurality of subdivisions;
   determining whether the physical defect is within a first subdivision;
   upon determining that the physical defect is within the first subdivision, mapping a preceding adjacent sector on the data track as a virtual defect;
   determining whether the physical defect is within a last subdivision; and
   upon determining that the physical defect is within the last subdivision, mapping a following adjacent sector on the data track as a virtual defect.

2. The method of claim 1, wherein the defective sector is logically divided into three subdivisions.

3. The method of claim 1, wherein the size and position of a plurality of physical defects within the defective sector are determined and utilized to determine one or more adjacent sectors of the data track to map as virtual defects.

4. The method of claim 1, wherein only one sector adjacent to the defective sector is mapped as a virtual defect.

5. The method of claim 1, wherein mapping an adjacent sector as a virtual defect comprises identifying the adjacent sector as scratch fill in a defects table of the storage device.

6. The method of claim 1, wherein the storage device is a hard disk drive device.

7. The method of claim 1, wherein the physical defect comprises a scratch in a recording surface of the recording medium.

8. A non-transitory computer-readable medium having processor-executable instructions stored thereon that, when executed by a processor, cause the processor to:
   detect a defective sector on a data track of a recording medium in a storage device;
   determine a size and position of a plurality of physical defects within the defective sector; and
   map one or more sectors of the data track adjacent to the defective sector as virtual defects based on the size and position of the plurality of physical defects within the defective sector.

9. The computer-readable medium of claim 8, wherein mapping the one or more of the adjacent sectors of the data track as virtual defects comprises:
   logically dividing the defective sector into a plurality of subdivisions;
   determining whether any of the plurality of physical defects is within a first subdivision;
   upon determining that any of the plurality of physical defects is within the first subdivision, mapping a preceding adjacent sector on the data track as a virtual defect;

determining whether any of the plurality of physical defects is within a last subdivision; and upon determining that the physical defect is within the last subdivision, mapping a following adjacent sector on the data track as a virtual defect.

10. The computer-readable medium of claim 9, wherein the defective sector is logically divided into three subdivisions.

11. The computer-readable medium of claim 8, wherein only one sector adjacent to the defective sector is mapped as a virtual defect.

12. The computer-readable medium of claim 8, wherein mapping an adjacent sector as a virtual defect comprises identifying the adjacent sector as scratch fill in a defects table of the storage device.

13. The computer-readable medium of claim 8, wherein a sector size for the storage device is 4 KB.

14. A system comprising:
a hard disk drive comprising a recording medium;
a processor operably connected to the hard disk drive; and
a virtual defect padding module operably connected to the hard disk drive and the processor and configured to perform steps of
detect a defective sector on a data track of the recording medium,
logically divide the defective sector into a plurality of subdivisions,
determine a size and position of a physical defect within the defective sector in regard to the plurality of subdivisions,
if it is determined that the physical defect is within a first subdivision of the plurality of subdivisions, map a preceding adjacent sector on the data track as a virtual defect, and
if it is determined that the physical defect is within a last subdivision of the plurality of subdivisions, map a following adjacent sector on the data track as a virtual defect.

15. The system of claim 14, wherein the defective sector is logically divided into three subdivisions.

16. The system of claim 14, wherein the size and position of a plurality of physical defects within the defective sector are determined, wherein if it is determined that any of the plurality of physical defects is within a first subdivision of the plurality of subdivisions, the preceding adjacent sector on the data track is mapped as a virtual defect, and wherein if it is determined that any of the plurality of physical defects is within a last subdivision of the plurality of subdivisions, the following adjacent sector on the data track is mapped as a virtual defect.

17. The system of claim 14, wherein mapping an adjacent sector as a virtual defect comprises identifying the adjacent sector as scratch fill in a defects table associated with the hard disk drive.

18. The system of claim 14, wherein a sector size for the hard disk drive is 4 KB.

* * * * *